United States Patent
Yi

(10) Patent No.: US 9,927,455 B2
(45) Date of Patent: Mar. 27, 2018

(54) MEMS CHIP FOR WIND SPEED MEASUREMENTS

(71) Applicant: Mingqiang Yi, San Pablo, CA (US)

(72) Inventor: Mingqiang Yi, San Pablo, CA (US)

( * ) Notice: Subject to any disclaimer, the term of this patent is extended or adjusted under 35 U.S.C. 154(b) by 0 days.

(21) Appl. No.: 14/655,051

(22) PCT Filed: Jan. 22, 2013

(86) PCT No.: PCT/US2013/022590
§ 371 (c)(1),
(2) Date: Jun. 24, 2015

(87) PCT Pub. No.: WO2014/116205
PCT Pub. Date: Jul. 31, 2014

(65) Prior Publication Data
US 2017/0199216 A1    Jul. 13, 2017

(51) Int. Cl.
*G01P 5/02* (2006.01)
*G01L 7/10* (2006.01)
*G01P 5/08* (2006.01)

(52) U.S. Cl.
CPC . *G01P 5/08* (2013.01); *G01P 5/02* (2013.01)

(58) Field of Classification Search
None
See application file for complete search history.

(56) References Cited

U.S. PATENT DOCUMENTS

| | | | | |
|---|---|---|---|---|
| 3,418,546 A * | 12/1968 | Beavers | G01L 1/142 73/170.25 |
| 5,515,735 A * | 5/1996 | Sarihan | G01F 1/383 73/861.42 |
| 7,788,981 B2 * | 9/2010 | Schmid | G01L 15/00 73/721 |
| 8,479,580 B2 * | 7/2013 | Shike | G01L 13/025 73/716 |
| 8,650,963 B2 * | 2/2014 | Barr | G01L 11/008 73/170.29 |
| 2015/0377662 A1* | 12/2015 | Ray | G01F 1/383 73/861.47 |

OTHER PUBLICATIONS

Wang, YH., Chen, CP., Chang, CM. et al. MEMS-based gas flow sensors, (2009), Springer Link, Microfluid Nanofluid 6:333-346.*
Berberig et al. The Prandtl micro flow sensor (PMFS): a novel silicon diaphragm capaciti9ve sensor for flow-velocity measurement, (1998), Elsevier, Sensors and actuators, pp. 93-98.*

* cited by examiner

*Primary Examiner* — Harshad R Patel

(57) ABSTRACT

A MEMS chip for wind speed measurements is provided. The chip integrates one or multiple embedded channels and a pressure sensor. The pressure sensor consists of a sensing membrane with a cavity beneath it. Each channel has one end connects to the cavity while the other end opens on the edge of the chip. To measure the wind speed, the membrane faces the wind and the air stagnates onto it while the channel connects the cavity to the static pressure. And the membrane deforms according to the wind pressure. The wind speed is then derived from the measured wind pressure.

2 Claims, 3 Drawing Sheets

MEMS CHIP FOR WIND SPEED MEASUREMENTS

BACKGROUND OF THE INVENTION

1. Field of the Invention

The present invention relates generally to flow measurement techniques. More particularly, the present invention provides a MEMS chip for wind speed measurements.

2. Description of the Related Art

Wind speed is a fundamental atmospheric rate and affects weather forecasting, aircraft and maritime operations, construction projects, growth and metabolism rate of many plant species, and countless other implications. Wind speed is measured using anemometer, which measures wind's speed or pressure. The wind pressure is calculated as:

$$p_w = \frac{\rho V^2}{2}$$

And Bernoulli's equation states:

$$p_t = p_s + p_w$$

Solving that for speed we get:

$$V = \sqrt{\frac{2(p_t - p_s)}{\rho}}$$

where:
V is the wind speed;
$P_w$ is the wind pressure;
$P_t$ is the stagnation pressure;
$P_s$ is the static pressure;
$\rho$ is the air density.

To date, microfabricated MEMS pressure sensor is widely used. However, to the best of my knowledge, MEMS pressure sensor has limited application in measuring the wind pressure.

Microelectromechanical systems (MEMS) (also written as micro-electro-mechanical, MicroElectroMechanical or microelectronic and microelectromechanical systems) is the technology of very small devices. MEMS pressure sensor usually consists of several components that interact with the pressure to be measured and some electrical components that process data. MEMS pressure sensor usually outperforms a pressure sensor made using the most precise macroscale level machining techniques. The benefits include high output sensibility, reliable batch production, good repeatability, low costs, low power, miniaturization, high performance, and integration etc. Anemometer based on MEMS chip is expected to carry on these benefits into the field and is highly desired.

BRIEF SUMMARY OF THE PRESENT INVENTION

The present invention comprises a MEMS chip for wind speed measurements and a method of measuring the wind speed by the MEMS chip. The invention includes one or multiple embedded channels inside a conventional MEMS pressure sensor chip. The pressure sensor consists of a membrane with a cavity beneath it. Each channel has one end connect to the cavity and the other end open on the edge of the chip. The channel connects the cavity to the static pressure when measuring the wind speed. The invention is configured to have the membrane facing the wind during the measurement and the moving air is brought to rest (stagnates) onto it. Then one side of the membrane is under the stagnation pressure while the other side is under the static pressure. And the membrane deforms according to the wind pressure.

Figure 1:
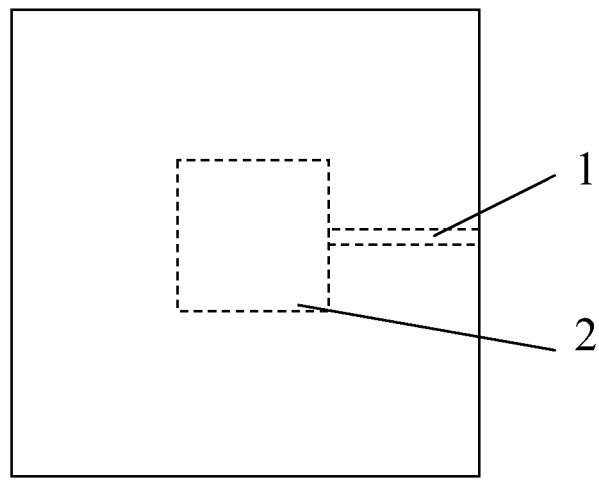
FIG. 1 shows the front view of the MEMS chip with a single channel.

REFERENCE NUMERALS IN THE DRAWINGS 1. channel
2. cavity
3. membrane
4. substrate
5. electrode

DETAILED DESCRIPTION OF THE INVENTION

Figure 2:
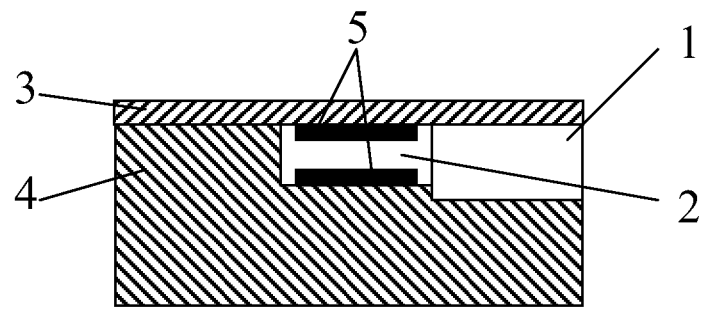
FIG. 2 shows the section view of the MEMS chip with a single channel.

As FIG. 1 and FIG. 2 show, the MEMS chip has a membrane 3 sitting on top of the substrate 4. The substrate 4 has a cavity 2. The cavity 2 is beneath the membrane 3. There are two parallel electrodes 5. One electrode is on the surface of the membrane 3 inside the cavity 2 and the other one is on the bottom of the cavity 2. The channel 1 is embedded inside the chip. One end of the channel 1 is connected to the cavity 2. And the other end of the channel 1 opens on the edge of the chip as FIG. 2 shows.

The membrane 3 faces the wind and the air is stagnated onto it during the measurement. Bernoulli's equation also tells that the edge of the chip is under the static pressure. So the cavity 2 is connected to the static pressure through the channel 1. And the membrane 3 deforms according to the pressure difference between the stagnation pressure and the static pressure, i.e. the wind pressure. This deformation is then transformed into measurable capacitance changes by the electrodes 5.

The whole chip size is 4 mm×4 mm and the cross section of the channel 1 is 200 μm×5 μm. The size of the cavity 2 is 900 μm×900 μm. The size of the electrodes 5 is 810 μm×810 μm. Without deformation, the distance between two electrodes 5 is 1 μm and the capacitance between them is calculated as:

$$C = \varepsilon \frac{A}{d} = 8.8542 \times 10^{-12} \times \frac{0.00081 \times 0.00081}{1 \times 10^{-6}} \approx 5.81 \text{ pico-Farad}$$

Where:
C is the capacitance between two parallel electrodes 5;
$\varepsilon$ is the permittivity of the space between two electrodes 5;

A is the surface area of the electrodes 5;
d is the distance between two electrodes 5 without deformation;
When a uniform wind pressure $P_w$ deforms the membrane 3, the maximum deformation $w_0$ is at the center of the cavity 2. And the relationship between $P_w$ and $w_0$ is, $$P_w = \left( \frac{4.06h^2}{1-v^2} + \frac{1.994(1-0.271v)w_0^2}{1-v} \right) \frac{E^2}{1-v^2} \frac{hw_0}{a^4}$$

Where:
h is the thickness of the membrane 3;
E is the Young's modulus of the membrane 3;
v is the Poisson ratio of the membrane 3;
a is the half length of the edge of the cavity 2;
In a two dimensional coordinate system (x, y) on the surface of the membrane 3, the origin of the coordinate system is at the center of the cavity 2. The axis x and the axis y are parallel to the edges of the surface of the cavity 2. The deformation w of the other locations of the membrane 3 is a function of x and y, $$w = w_0 \left(1 - \frac{x^2}{a^2}\right)^2 \left(1 - \frac{y^2}{a^2}\right)^2 \left(1 + 1.1 \frac{x^2 + y^2}{a^2}\right)$$

Then the capacitance between two electrodes 5 after the deformation is calculated as, $$C = \varepsilon \iint_{electrode} \frac{dxdy}{d - w(x,y)}$$

The wind pressure changes the separation distance between two electrodes 5, and the capacitance changes accordingly.

Figure 4:
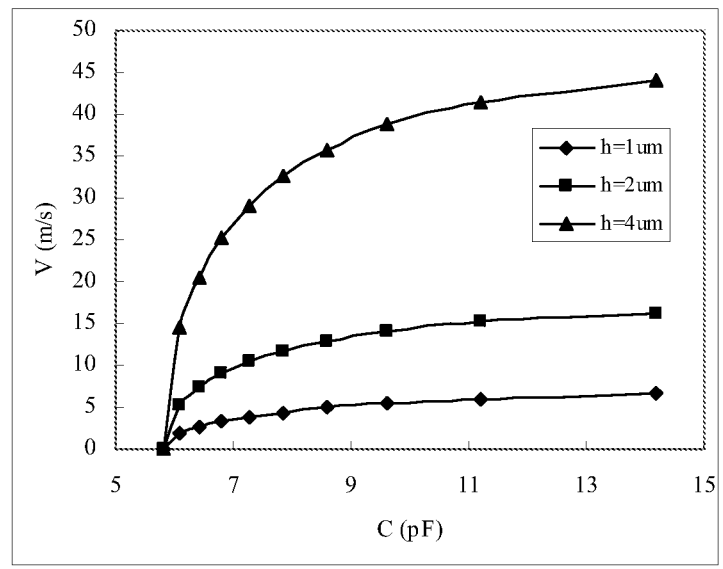
FIG. 4 shows the wind speed corresponding to the capacitance when membrane thickness is 1 μm, 2 μm, or 4 μm.
Figure 5:
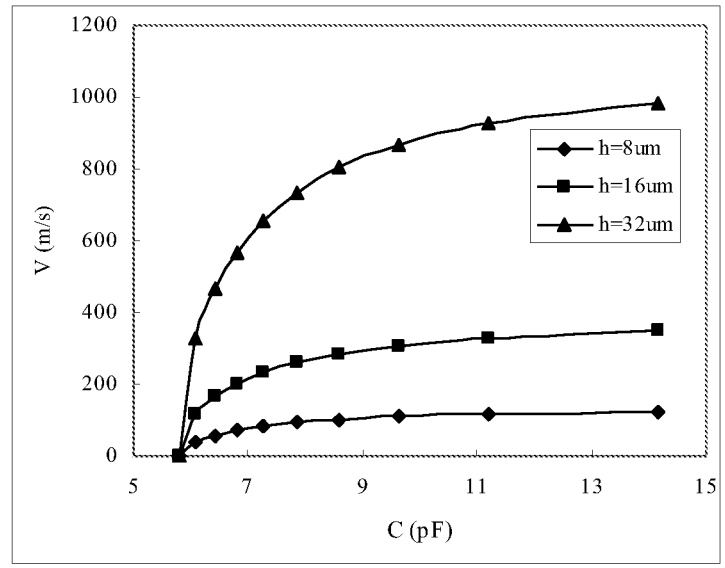
FIG. 5 shows the wind speed corresponding to the capacitance when membrane thickness is 8 μm, 16 μm, or 32 μm.

FIG. 4 and FIG. 5 depict the wind speed corresponding to the capacitance of the chip. And in the calculation, the Young's modulus of the membrane is 169 GPa; the Poisson ratio of the membrane is 0.3; the density of the air is 1.23 kg/m3.

Figure 3:
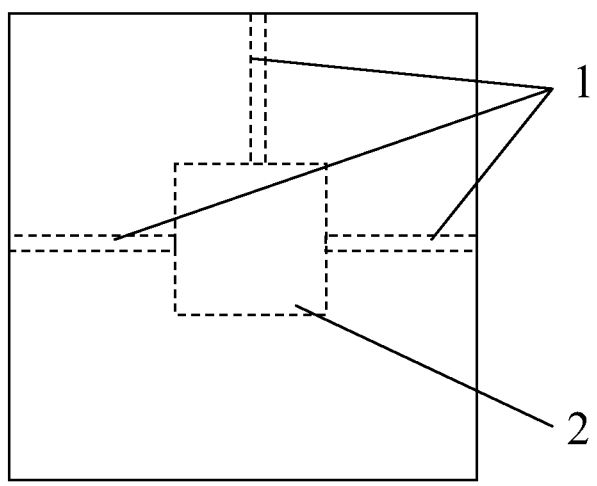
FIG. 3 shows the front view of the MEMS chip with three channels.

FIG. 3 shows another chip, where three channels 1 are used. Each channel has one end connect to the cavity 2. And the other end opens on the edge of the chip. This embodiment reduces the resistances for the air entering or leaving the cavity 2. Then the chip responds faster.

It is also understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A MEMS chip for wind speed measurements including a pressure sensor and an embedded channel that is sealed inside the MEMS chip except one opening end on an edge of the chip; the pressure sensor includes a substrate with a cavity, two parallel electrodes, and a pressure sensing membrane sitting on top of the substrate over the cavity; one of the two parallel electrodes is on an inner surface of the pressure sensing membrane inside the cavity of the substrate, and the other electrode is on the bottom of the cavity of the substrate; the embedded channel has one end connected to the cavity and another end opening on the edge of the chip; the pressure sensing membrane faces the wind and the air is stagnated onto the pressure sensing membrane; the embedded channel connects the cavity to the static pressure $P_s$; the pressure sensing membrane deforms according to $P_t - P_s$, wherein $P_t$ is the stagnation pressure; the maximum membrane deformation is in a center of the cavity and a deformation w at other locations of the membrane is a function of x and y, wherein (x, y) is a two dimensional coordinate system on the surface of the membrane; the capacitance C between two electrodes after the deformation is calculated as $$C = \varepsilon \iint_{electrode} \frac{dxdy}{d - w(x,y)},$$

where $\varepsilon$ is the permittivity and d is the distance between two electrodes without deformation, the wind speed V is derived from a formula $$\sqrt{\frac{2(P_t - P_s)}{\rho}},$$

wherein $\rho$ is the air density.

2. A MEMS chip for wind speed measurements including a pressure sensor and at least three embedded channels sealed inside the MEMS chip except that each channel has one opening end on an edge of the chip; the pressure sensor includes a substrate with a cavity, two parallel electrodes, and a pressure sensing membrane sitting on top of the substrate over the cavity; one electrode is on an inner surface of the pressure sensing membrane inside the cavity of the substrate, and the other electrode is on the bottom of the cavity of the substrate; each embedded channel has one end connected to the cavity and another end opening on each edge of the chip; the pressure sensing membrane faces the wind and the air is stagnated onto the pressure sensing membrane; each embedded channel connects the cavity to the static pressure $P_s$; the pressure sensing membrane deforms according to $P_t - P_s$, wherein $P_t$ is the stagnation pressure; the maximum membrane deformation is at the center of the cavity and a deformation w at other locations of the membrane is a function of x and y, wherein (x, y) is a two dimensional coordinate system on the surface of the membrane; the capacitance C between the two electrodes after the deformation is calculated as $$C = \varepsilon \iint_{electrode} \frac{dxdy}{d - w(x,y)},$$

where $\varepsilon$ is the permittivity and d is the distance between two electrodes without deformation; the wind speed V is derived from a formula:

$$V = \sqrt{\frac{2(P_t - P_s)}{\rho}},$$

wherein $\rho$ is the air density.

* * * * *